May 1, 1962 A. H. YOUMANS 3,032,658
RADIATION DETECTORS
Filed Jan. 22, 1957 2 Sheets-Sheet 2

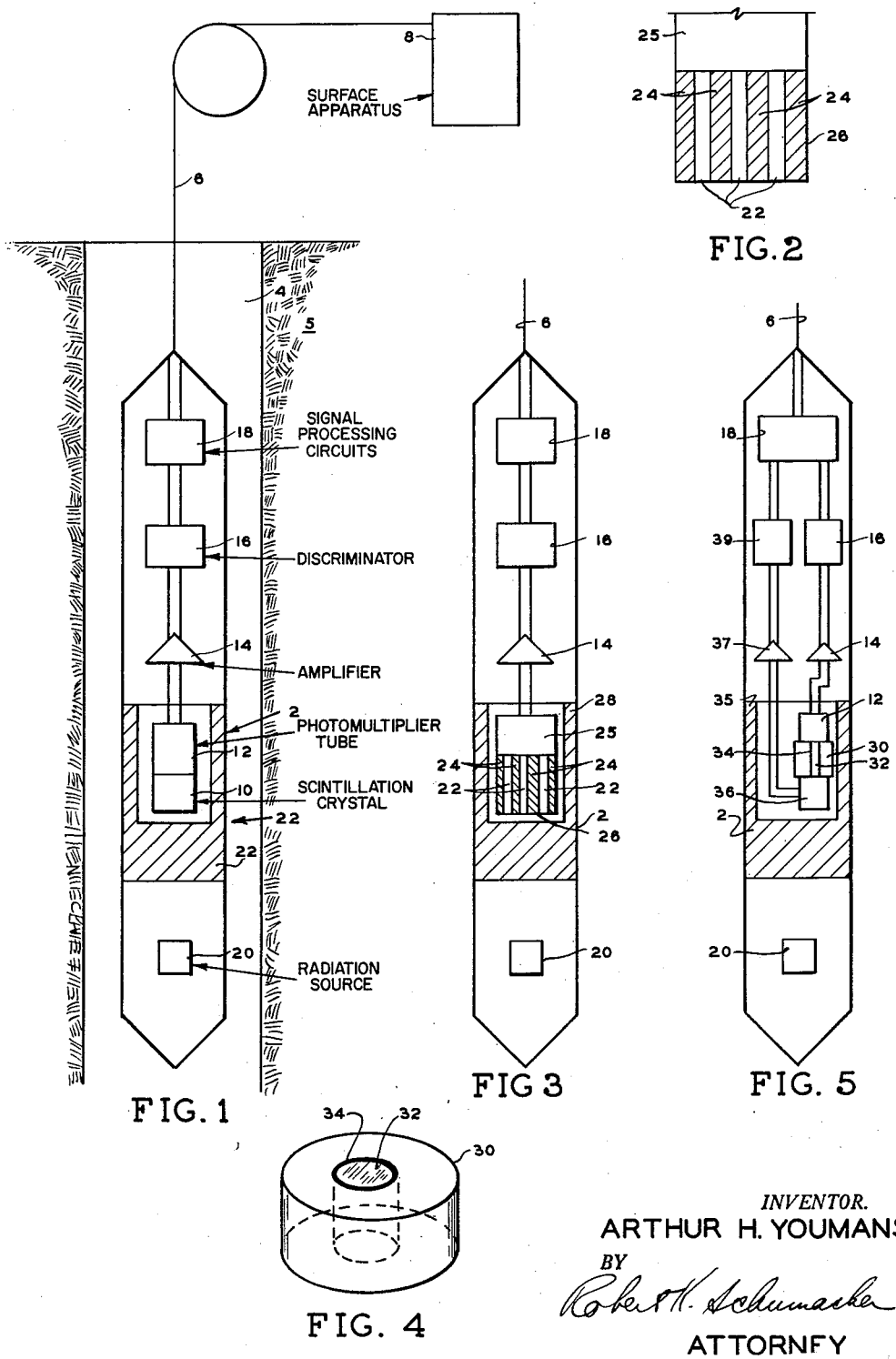

INVENTOR.
ARTHUR H. YOUMANS
BY
Robert K. Schumacher
ATTORNEY

United States Patent Office 3,032,658
Patented May 1, 1962

3,032,658
RADIATION DETECTORS
Arthur H. Youmans, Tulsa, Okla., assignor to Well Surveys, Incorporated, a corporation of Delaware
Filed Jan. 22, 1957, Ser. No. 635,363
4 Claims. (Cl. 250—71.5)

This invention relates to radioactivity well logging, and particularly to novel radiation detectors for use in well logging.

In the art of radioactivity well logging, a detecting instrument is lowered into a borehole or well to detect radiations emanating from the formations surrounding the borehole. Gamma rays are emitted naturally by various radioactive elements which are found in all formations. They may also be produced artificially by bombarding the formations with radiations from sources of gamma rays or neutrons passed along the borehole. Neutrons from such a source may be scattered in the formations and returned to the borehole. Continuous measurement along a borehole of the natural gamma rays is known in the art as gamma ray logging. Continuous measurement of gamma rays emitted by the formations simultaneously with neutrol irradiation is known as neutrol-gamma logging. Where the gamma ray measurement is delayed following neutron irradiation, and gamma radiation is from elements rendered artificially radioactive by this irradiation, the process is known as activation logging. Where neutrons are measured during neutron irradiation, it is known as neutron-neutron logging. Each of these measurements provides information which is extremely valuable to geologists and geophysicists in prospecting for oil and other minerals. Moreover, by making a spectral analysis of the radiations, that is, by observing gamma rays and neutrons of different energy levels, additional information may be obtained.

Numerous types of radioactivity detectors, such as ionization chambers, proportional counters, Geiger-Mueller counters and scintillation counters, have been proposed heretofore and each of these has advantages and disadvantages which are well known to workers in nuclear fields. However, none of the detectors of the prior art have been entirely satisfactory under the rugged and unusual conditions of well logging. For example, the detectors heretofore have provided poor resolution between gamma rays and neutrons. Consequently, it has been extremely difficult to distinguish neutrons from the gamma ray background. This has presented a serious problem in radioactivity well logging since the gamma ray flux is always very great due to natural radioactivity and gamma radiations which accompany neutron bombardment of the formations. Furthermore, the detectors of the prior art have had little or no response to neutrons having energies above the thermal range and none of these detectors have provided reliable indications of the energies of the neutrons as they strike the detector. Consequently, analyses of neutron energy distributions have been inaccurate and unreliable.

These disadvantages of the prior art devices are overcome with the present invention. In addition, novel methods and apparatus for radiation detection are provided whereby gamma rays and neutrons may be detected either simultaneously or separately with a minimum of background response. Moreover, the energy range in which gamma rays and neutrons may be detected is greatly increased and the energy spectrum of the incident radiations is reliably indicated. Accordingly, accurate spectral analyses may be made of either type of radiation, or of both simultaneously.

The advantages of the present invention are preferably attained by employing a novel scintillation crystal formed of lithium iodide and by providing novel instrumentation to take full advantage of the unique properties of this material.

Accordingly, it is an object of the present invention to provide a novel radiation detector for use in radioactivity well logging.

A further object of the present invention is to provide a novel radiation detector which permits detection of gamma rays and neutrons either simultaneously or separately.

An additional object of the present invention is to provide a novel radiation detector which facilitates detection of neutrons in the presence of a strong gamma ray flux.

A further object of the present invention is to provide a novel radiation detector having a response which is truly representative of the energy of the incident radiation.

Another object of the present invention is to provide a novel radiation detector which permits spectral analyses of either gamma rays or neutrons or of both simultaneously.

A specific object of the present invention is to provide a novel radiation detector employing lithium iodide as a scintillation material together with novel instrumentation which takes full advantage of the unique properties of this material.

These and other objects and advantages of the present invention will be apparent from the following description wherein reference is made to the figures of the accompanying drawings.

In the drawings:

FIG. 1 is a diagrammatic representation of a typical radioactivity well logging instrument embodying the present invention suspended in a well;

FIG. 2 is a perspective of a modified form of the scintillation crystal of the device of FIG. 1;

FIG. 3 is a schematic representation of a modified form of the subsurface instrument of FIG. 1, partly in section, utilizing the crystal of FIG. 2;

FIG. 4 is a perspective of a further modified form of the scintillation crystal of the device of FIG. 1;

FIG. 5 is a schematic representation of a further modified form of the subsurface instrument of FIG. 1, utilizing the crystal of FIG. 4;

Figure 6:
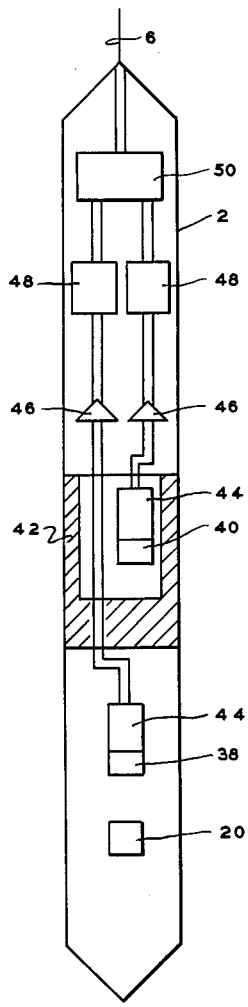
FIG. 6 is a schematic representation of a further modified form of the subsurface instrument of FIG. 1.

In that form of the invention chosen for purposes of illustration in FIG. 1, a typical subsurface instrument 2 is shown suspended in a well 4 in the earth 5 by means of a cable 6 which also serves to transmit signals from the instrument 2 to surface apparatus 8 at the surface of the earth. Surface apparatus 8 may include various conventional pieces of equipment for hoisting the subsurface instrument and for processing and recording the signals in correlation with the depth at which they arose.

Within the subsurface instrument 2 is a scintillation crystal 10 which is composed of lithium iodide. The crystal 10 is optically connected to a photomultiplier tube 12 in a manner well known in the art. Thus, upon bombardment of the crystal 10 by radiation, light pulses will be emitted which will be translated by the photomultiplier 12 into corresponding electrical pulses. These electrical pulses are then passed through an amplifier 14, a discriminator 16 and other suitable signal processing circuits 18 which put the signals in condition for placing them on the cable 6 for transmission to the surface apparatus 8.

The radiations may be emitted naturally by one or more of the radioactive elements which occur in varying quantities in all rocks or they may arise from irradiating the formations with radiations from a source 20 which may be located within the instrument 2 in a conventional manner. When a source, such as source 20 is employed, it may be either a natural source, such as radium-beryllium, actinium-beryllium or the like, or may be an artificial source, such as a particle accelerator. In any event, the radiations which are most important for radioactivity well logging are, as noted previously, gamma rays and neutrons, and it has been found that scintillation crystals composed of lithium iodide are extremely versatile for detecting these radiations.

Thus, lithium iodide crystals, suitably activated with europium, have a gamma ray response which is very good, being about one-fourth as great as that of sodium iodide and may have nearly 100% efficiency for slow neutron detection. Moreover, lithium iodide is responsive to both thermal and epithermal neutrons without requiring the use of a moderator to slow the latter to thermal energy. Most of the prior art detectors have had little or no response to neutrons above the thermal energy range. A $BF_3$ proportional counter, for example, requires a moderator to reduce the energy of incident neutrons in order to detect them with reasonable efficiency.

A further, and highly important, advantage of lithium iodide scintillation crystals arises from the fact that the crystal detects neutrons by detecting the effect of the disintegration products of the $Li(n,\alpha)H^3$ reaction. Consequently, all neutrons will be represented by pulses indicative of at least about 4.8 mev. energy release in the crystal, 4.8 mev. being approximately the energy of this reaction. Thus, if the incident neutrons have energies which are low compared to this value, they will be represented by 4.8 mev. pulses while neutrons having energies appreciable compared to 4.8 mev., or larger, will be represented by larger pulses, indicative of the sum of the neutron energy and the energy of the reaction. This is extremely desirable as it provides a plateau in the integral pulse height distribution from the scintillation counter which allows the discriminator to be set at a point such that all of the neutrons are detected but which is considerably higher than the energy level of substantially all gamma rays. Therefore, discrimination is greatly simplified. Moreover, the plateau makes it possible to maintain the detector sensitivity stable in spite of the effects of drifts caused by variations in the electronic equipment, such as thermal drifts. With prior art scintillation detectors, these drifts cause a variation in the effective energy at which discrimination occurs with the result that a drift in counting rate occurs which is often mistakenly interpreted as a change in the incident radiation flux.

Fast neutron detectors of the prior art, such as scintillation counters using organic phosphors, have all been of the recoil type in which the scintillation is produced by the recoil of hydrogen nuclei of the phosphor, the energy of which depends upon the angle at which the neutrons strike the hydrogen nuclei. When the neutrons strike glancing blows, the neutrons themselves retain a substantial portion of the initial energy. These neutrons may then escape from the detector without producing ionization. Because of this, the energy of the incident neutrons could not be unambiguously determined from the pulse height distribution thereby rendering impossible any accurate spectral analysis of the energies of the neutrons.

In the instant invention, the energy of the products of each $Li(n,\alpha)H^3$ reaction includes all of the energy of the incident neutrons. The reaction products, a triton and an alpha particle, are both charged particles, and therefore both ionize the scintillation crystal. Since all of the ionization can be accurately measured, a measurement of this ionization will be truly indicative of the energy of the incident neutrons, except for the relatively rare occasions where ions are produced near a crystal surface and escape with some energy. All that need be done is to subtract from the measurement the constant 4.8 mev. which is the inherent energy of the reaction. This may be accomplished by adjusting the discriminator so as to barely reject pulses indicative of an energy release in the crystal of 4.8 mev. Discriminator 16 may take the form of a conventional differential discriminator passing pulses of one particular energy range, or it may be a conventional pulse height analyzer which passes several channels of information simultaneously but separately, thereby permitting a detailed spectral analysis of the fast neutrons. This is virtually impossible with any other detector heretofore known in the well logging art.

Using a lithium iodide crystal in the instrument of FIG. 1, without the source 20, a natural gamma ray log may be made. In a similar way gamma rays may be detected which arise from artificially radioactive elements produced by prior irradiation of the formation by a neutron source, as for example, if a neutron source is employed as source 20 it irradiates the formations which may later be surveyed by the detector, crystal 10. If a shield 22, formed of a neutron absorbing substance, such as boron, is provided about the crystal 10, when the source 20 is a neutron source, neutron-gamma logs may be made with the discriminator set as low as perhaps 2 mev. On the other hand, particularly if the shield 22 is formed of a gamma ray absorbing material, for example, lead or bismuth, the same crystal may be used to make neutron-neutron logs.

Moreover, additional benefits may be obtained by employing a crystal having a high percentage of the $Li^6$ isotope. With normal lithium iodide, about 10% of the thermal neutrons captured by the crystal are captured by the iodine. This produces $I^{128}$ which is radioactive with a half life of about 25 minutes. Moreover, for resonance neutrons, that is, those neutrons having energies corresponding to the resonant capture of various materials and including, generally, those neutrons having energies less than perhaps 1000 electron volts, the iodine is of the order of 10 times more effective than the lithium contained in unenriched lithium iodide. Consequently, it is normally necessary to set the discriminator in the output of the photomultiplier to pass only signals above the 2 mev. level of the highest energy beta particles emitted by the $I^{128}$ isotope. On the other hand, enrichment of the crystal with the $Li^6$ isotope reduces the relative iodine activation effect by a factor of as much as 15 due to the increased relative capture cross section of the lithium. Therefore, a lithium iodide crystal, such as 10 in FIG. 1, enriched with $Li^6$, may be used to detect gamma rays or neutrons or both, and the discriminator 16 may be set as low as desired without substantial interference from the iodine activation.

As a result of these effects, lithium iodide crystals enriched with $Li^6$ and suitably activated, for example, with europium, have several distinct advantages over the scintillation crystals of the prior art. For example, if the discriminator 16 is set to block pulses less than about 5 mev., all of the low energy gamma ray and neutron signals will be eliminated and only high energy gamma rays and fast neutrons will produce signals above this level. Therefore, if the spacing between source and detector is chosen so that the number of fast neutrons detected is relatively small, the crystal 10 may be used for gamma ray spectroscopy. Conversely, with a different spacing between the source and detector, the crystal 10 may be made to respond primarily to neutrons. Obviously, additional stages of discrimination or pulse height analysis may be employed, if desired, set at higher or intermediate levels to obtain a more detailed spectral analysis.

A further use may be made of the device of FIG. 1 when the source 20 is a particle accelerator or other neutron source capable of emitting neutrons having energies in excess of 10 mev. With the accelerator turned on, the crystal 10 will make neutron measurements in the manner described above. Thereafter, if the accelerator is turned off and the instrument is moved so that the crystal 10 is in the position formerly occupied by the source 20, the crystal 10 will observe gamma rays emitted as a result of oxygen activation in the formations, since these gamma rays have energies of the order of 6 mev. In activation logging, only those gamma rays from oxygen activation are of energy greater than 3 mev. This information is extremely useful in distinguishing between formations containing water and those containing oil.

For neutron detection, additional advantages may be obtained by forming the crystal in such a way that the thickness in any direction is somewhat less than the range of a 4 mev. beta ray. In this way, few gamma rays will produce pulses as large as those corresponding to the disintegration particles from the lithium (n, alpha) reaction. This may be accomplished, as seen in FIG. 2, by providing a plurality of spaced cylindrical rods 22 formed of lithium iodide and surrounded with a beta ray absorbing material 24 such as silicone oil, enclosed within a suitable casing 26. A single photomultiplier tube 25 may be optically connected to all of the rods 22, as seen in FIG. 3, or, if space permits, separate photomultiplier tubes may be provided for each rod 22. The discriminator 16 may then be set to pass only those pulses which indicate particles having energies in excess of 4 mev. Thus, the effect of the gamma rays is virtually eliminated while the neutron signal is retained. To further reduce the effect of gamma rays, a dense gamma ray shield 28 of lead or bismuth may be provided about the casing 26, as seen in FIG. 3. For detection of resonance neutrons, to the exclusion of thermal and epithermal neutrons, the shield 28 may be formed of boron or the like suitably chosen to absorb the neutrons to be excluded from the measurement.

Additional advantages may be obtained by forming the crystal in the shape of an annulus, as seen at 30 in FIG. 4 wherein the wall thickness of the annulus 30 is comparable to or preferably less than the range of a 4 mev. beta ray. The core of the annulus may then be filled with a different scintillation material 32 such as sodium iodide, having the sides thereof coated with a reflective material 34 so that light pulses will be prevented from passing from one scintillation material to the other. The coating 34 will also, preferably, be formed of a beta ray absorbing material to prevent passage of beta rays from the annulus 30 to the core 32.

As seen in FIG. 5, the core material 32 is preferably provided with a separate photomultiplier 36, amplifier 37 and discriminator 39, so that its signal will be distinct from that of annulus 30. With this arrangement, the detector of the present invention is ideally suited for simultaneous logging operations wherein gamma rays and neutrons are detected and recorded simultaneously but independently. Thus, only neutrons would be detected by the annulus 30 and its associated electronic apparatus, as described above. Moreover, the annulus 30 would serve as a shield for the core material 32 and would permit the core material 32 to make a gamma ray measurement which would be substantially free from the effects of thermal neutrons. In the alternative, the detector may be made to distinguish between thermal and epithermal neutrons. It should be noted that, for this purpose, the thermal neutrons must be detected by the annulus 30; otherwise, most of them would be absorbed before they could penetrate to the core 32 and, consequently, their effect would be lost. In this instance the coating 34 is preferably formed of cadmium to prevent passage of thermal neutrons to the core material 32 and the core material is a Li$^6$I scintillation crystal. Furthermore, if desired, special analyses of epithermal neutrons may be made using the apparatus of FIG. 5. To accomplish this, the annulus 30 may be formed of unenriched lithium iodide, and a shield 35, formed of cadmium or the like, may be provided about the outer surface of the annulus 30. The core 32 is preferably formed of Li$^6$I while the coating 34 may be substantially any material which is opaque to light. With this arrangement, the annulus 30 will detect epithermal neutrons of relatively low energies while the core 32 will detect epithermal neutrons of relatively high energies. The logs made by the annulus 30 and core 32 may then be compared or combined to provide an indication of the energy distribution of the epithermal neutrons. Additional information may, if desired, be obtained by forming the coating 34 of a material, such as gold, silver or indium, having a resonant absorption for neutrons. Thus, the detector may be made to examine the relative neutron flux in various particular energy ranges.

From the foregoing description, it will be seen that lithium iodide crystals, especially when enriched with the Li$^6$ isotope and activated with europium, are ideally suited to well logging operations. The crystal is uniquely suitable for spectral analyses of gamma rays or neutrons since it is capable of detecting gamma rays and neutrons over virtually all ranges of energies. Additionally, spectral measurements of either gamma rays or fast neutrons may readily be obtained by pulse height analysis. Furthermore, the filled core annular form of the detector, described and shown with respect to FIGS. 4 and 5, makes it possible to make substantially gamma-ray-free neutron logs or neutron-free gamma ray logs as well as to make extremely accurate special analyses of either type of radiation or to make simultaneous logs, including simultaneous spectral analyses of gamma rays and neutrons. None of the prior art detectors provided this versatility.

In addition, the detector of the present invention has several advantages over prior art detectors when employed for making multispaced neutrons logs, as in FIG. 6, wherein two detectors 38 and 40 are spaced different distances from the source 20, which is a neutron source in this instance. Detector 40 may be arranged to detect predominantly epithermal neutrons, while detector 38 detects both thermal and epithermal neutrons. To do this, detector 40 is preferably formed of Li$^6$ enriched lithium iodide as its high sensitivity to epithermal neutrons permits a relatively high counting rate in spite of the long distance between source and detector. In this instance, detector 38 may be formed of either normal or enriched lithium iodide. Moreover, if desired, a shield 42 of cadmium, boron or the like may be provided about detector 40 to prevent any thermal neutrons which might be present from reaching the detector 40.

As seen in FIG. 6, each detector 38 and 40 is provided with its own photomultiplier tube 44 which receives scintillations from the associated detector and translates them into corresponding electrical pulses. These pulses may then be passed through their respective amplifiers 46 and discriminators 48 to the signal processing circuit 50 which places the signal in condition for transmission up the cable. If desired, the signals from detectors 38 and 40 may be differentially combined by the signal processing circuit 50 in a conventional manner. On the other hand, if desired, the signals of detectors 38 and 40 may be transmitted up the cable independently and recorded or combined and recorded or both at the surface by conventional means.

Figure 7:
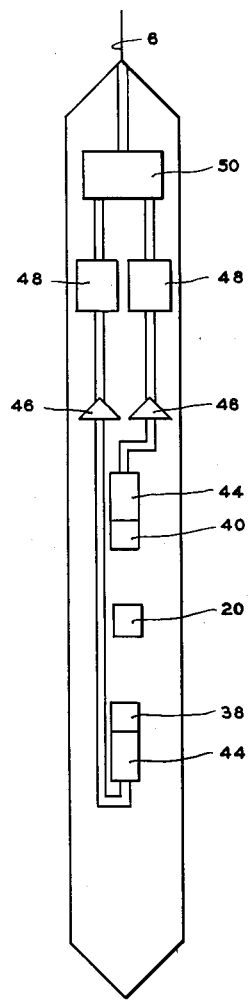
FIG. 7 is a schematic representation of an additional modified form of the subsurface instrument of FIG. 1.

FIG. 7 discloses a further modified form of the device of FIG. 6 wherein detectors 38 and 40 are spaced equal distances from the source 20 to detect thermal and epithermal neutrons respectively. As shown, detector 38 is located below the source 20 while detector 40 is located above the source. However, it is immaterial which detector is in which position. If detector 38 is to be the thermal neutron detector, it is preferably formed of unenriched lithium iodide since it is less sensitive to epithermal neutrons than enriched lithium iodide. Furthermore, detector 38 should preferably be formed in an annulus, as in FIG. 4 or be small in size in order that its efficiency for the detection of epithermal neutrons will be relatively low. If crystals 38 and 40 are formed of the same material and the source 20 is a particle accelerator, one crystal, for example, crystal 40 will precede the source 20 and, hence, may be made to detect only neutrons while the other crystal, in this case, crystal 38 will follow the source 20 and may be made to detect both neutrons and high energy gamma rays due to oxygen activation as explained above. The outputs of these crystals may then be differentially combined to obtain a measurement of the amount of gamma radiation resulting from the oxygen activation.

If, in FIG. 7, one of the detectors, say 38, is $Li^6I$ while the other is composed of normal $LiI$, a further valuable measurement may be made. For this purpose, a shield of cadmium is disposed about both detectors so that epithermal neutrons will be detected. The two detectors will, however, have relatively different efficiencies for epithermal neutrons of lower and higher energy, respectively. Thus, if both crystals are of a size suitable for well logging, i.e., have dimensions of the order of one inch or more, both will have very high efficiency, approaching 100 percent, for the lowest energy epithermal neutrons, and will therefore be comparable in efficiency for this energy range. For high energies, both decrease in efficiency; however, the $Li^6I$ maintains about 14 times the sensitivity of the normal lithium even at the highest energies. Consequently, for neutrons just slightly higher in energy than those absorbed by the cadmium shield, both crystals may be substantially 100 percent efficient, but, at higher energies, the $Li^6I$ will always be the more efficient. Therefore, the two detectors observe a different proportion of higher and lower energy neutrons and a ratio or other comparison of the two detector outputs will give an indication of the energy spectrum of the epithermal neutrons. This measurement will indicate the ability of the formations to moderate neutrons, and in particular gives a sensitive indication of the abundance of hydrogen. This is a measurement of great value in well logging for petroleum, which is hydrogenous.

It will be seen that another means of accomplishing this same result is to employ two crystals which are identical in their isotopic composition but differ appreciably in size. In this way, the smaller of the two will have less efficiency for higher energy neutrons and a comparison of the logs made by the two detectors will indicate the relative abundance of lower and higher energy epithermal neutrons. Preferably, both crystals will be sufficiently large in one or more dimensions to have an efficiency approaching 100 percent for the lowest energy epi-cadmium neutrons.

Yet another means may be employed to accomplish this result. The two detectors may be as described above, or in fact they may be identical, both being shielded by a material, such as cadmium. Additionally a uniform layer of boron, lithium or the like is disposed about the crystal which is intended to be a detector of higher energy neutrons. The thickness of this layer is chosen sufficiently thick to absorb substantially all epithermal neutrons of energy up to any chosen level. The shielding layer, of course, absorbs a determinable quantity of high energy neutrons but, at higher energies, a proportionately greater number of neutrons are transmitted, and these may be detected in the crystal. Thus the doubly shielded crystal records relatively more epithermal neutrons of higher energy, and a comparison of the two logs made by the respective detectors gives the desired information relative to the spectral distribution of epithermal neutron energies.

Figure 8:
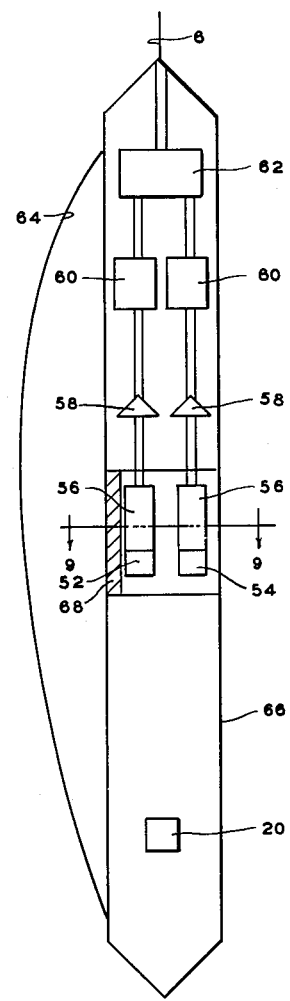
FIG. 8 is a schematic repersentation of another modified form of the subsurface instrument of FIG. 1.

A further modified form of the invention is illustrated in FIG. 8 wherein two crystals 52 and 54 are mounted side by side equidistant from the source 20. Each crystal is provided with its own photomultiplier tube 56, amplifier 58 and discriminator 60 and the signals from both crystals are supplied to signal processing circuits 62 which put the signals in condition for transmission up the cable 6.

Figure 9:
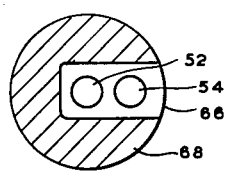
FIG. 9 is a sectional view of the device of FIG. 8 taken on the line 9—9 thereof.

Preferably, a decentralizing spring 64 is secured to the instrument to urge one side 66 of the instrument into contact with the wall of the well. This permits a wide variety of measurements to be made. Thus, as seen in FIGS. 8 and 9, the crystals 52 and 54 may be arranged in tandem with respect to side 66 of the instrument, and suitable shielding 68 may be provided about the sides and back of the detectors. With this arrangement, if both detectors are substantially identical, measurements may be made showing the effect of the different amounts of separation from the wall of the well.

On the other hand, if source 20 is a neutron source, and if detector 54 is formed of unenriched lithium iodide while detector 52 is enriched with $Li^6$, detector 54 will observe the thermal and lower epithermal neutrons whereas detector 52 will observe relatively more higher epithermal neutrons. This is true because, although a crystal of unenriched lithium iodide may be substantially 100 percent efficient for thermal neutrons, its efficiency drops off rather rapidly with increasing neutron energy. On the other hand, the efficiency of $Li^6$ enriched crystals remains at or near 100 percent up to considerably higher energies. Thus, for neutrons having energies of the order of 10 mev. or more, an enriched crystal may be of the order of 10 times more efficient than the unenriched crystal. If desired, a shield of cadmium or the like may be provided between detector 54 and side 66 of the instrument to prevent thermal neutrons from reaching the detectors 52 and 54 to permit spectral analyses of epithermal neutron energies. Moreover, if desired, a shield of gold, silver indium or similar material having a resonant absorption for neutrons may be inserted between the detectors 52 and 54 for examination of the neutron flux in particular energy ranges. Similarly, by the use of suitable shielding, the detectors may be employed to make gamma ray spectral analyses or one detector, for example, detector 52, can be made to detect gamma rays while the other detector, in this case detector 54, may be made to detect neutrons.

Figure 10:
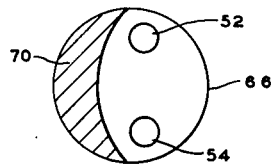
FIG. 10 is a view similar to FIG. 9 showing a modified arrangement of the detectors.

As a further alternative, the detectors 52 and 54 may be mounted abreast of each other, as seen in FIG. 10, rather than in tandem, as in FIG. 9. With this arrangement, the detectors 52 and 54 will observe substantially identical areas of the formations. Thus, by suitable shielding, comparisons may be made between the relative flux of gamma rays and neutrons, or spectral analyses may be made of either type of radiation. Preferably, for such measurements, the instrument will be provided with a decentralizing spring, such as spring 64 in FIG. 9, and shielding 70 may be provided adjacent the back of the instrument to prevent radiations traveling in the borehole from effecting the logs. On the other hand, by replacing decentralizing spring 64 with a centralizer and eliminating the shielding 70, additional useful information may be obtained.

Numerous other variations and modifications may also, obviously, be made. Accordingly, it should be clearly understood that those forms of the invention described above and shown in the figures of the accompanying drawings are illustrative only and are not intended to limit the scope of the invention.

I claim:

1. Means for detecting radioactivity comprising an annulus containing lithium iodide, the inner walls of said annulus being coated with a substance which is opaque to light, and sodium iodide contained in the core of said annulus, a first photomultiplier tube optically coupled to said annulus, and a second photomultiplier tube optically coupled to said core.

2. Means for detecting radioactivity comprising an annulus containing unenriched lithium iodide, the inner walls of said annulus being coated with a substance which is opaque to light, and lithium iodide having a high percentage of the $Li^6$ isotope contained in the core of said annulus, a first photomultiplier tube optically coupled to said annulus, and a second photomultiplier tube optically coupled to said core.

3. An instrument for determining the relative flux of radioactivity at different energy levels comprising a first scintillation crystal composed of lithium iodide, a second scintillation crystal composed of lithium iodide differing isotopically from said first crystal, a first photosensitive device optically coupled to said first crystal, a second photosensitive device optically coupled to said second crystal, and means optically shielding said first photosensitive device from said second crystal, and shielding said second photosensitive device from said first crystal.

4. A detector for detecting neutrons in the presence of gamma rays comprising a shell containing lithium iodide, the thickness of said shell being less than the range of a 4 mev. beta ray, photosensitive means exposed to said shell for converting scintillations from said shell into electrical pulses, and a discriminator connected to receive said electrical pulses and having a discrimination threshold passing only such pulses as are of greater magnitude than those occasioned by beta rays passing transversely entirely through said thickness of shell, whereby the pulses passed by said discriminator are indicative of incident neutrons to the substantial exclusion of indication of incident gamma rays.

References Cited in the file of this patent
UNITED STATES PATENTS

| | | |
|---|---|---|
| 2,692,949 | MacKnight | Oct. 26, 1954 |
| 2,769,916 | Tittle | Nov. 6, 1956 |
| 2,782,318 | Herzog | Feb. 19, 1957 |
| 2,785,314 | Grahame | Mar. 12, 1957 |
| 2,795,703 | Berlman | June 11, 1957 |
| 2,799,780 | Ruderman | July 16, 1957 |
| 2,828,423 | Scherbatskoy | Mar. 25, 1958 |
| 2,829,264 | Garrison | Apr. 1, 1958 |
| 2,830,186 | Scherbatskoy | Apr. 8, 1958 |
| 2,830,188 | Scherbatskoy | Apr. 8, 1958 |
| 2,850,642 | Seevers | Sept. 2, 1958 |
| 2,862,106 | Scherbatskoy | Nov. 25, 1958 |

OTHER REFERENCES

Connally: Two Crystal Gamma-Ray Scintillation Spectrometers, Rev. of Sci. Inst., v. 24, No. 6, pp. 458–459, June 1953.

Muehlhause: Neutron Scintillation Counters, Nucleonics, v. 14, No. 4, April 1956, pp. 38–39.

UNITED STATES PATENT OFFICE
CERTIFICATE OF CORRECTION

Patent No. 3,032,658                        May 1, 1962

Arthur H. Youmans

It is hereby certified that error appears in the above numbered patent requiring correction and that the said Letters Patent should read as corrected below.

Column 1, line 24, for "neutrol" read -- neutron --; lines 24 and 25, for "neutrol-gamma" read -- neutron-gamma --; line 45, after "heretofore" insert -- known --; column 6, lines 1 and 33, for "special", each occurrence, read -- spectral --; column 8, line 30, for "10 mev." read -- 10 ev. --.

Signed and sealed this 21st day of August 1962.

(SEAL)
Attest:

ESTON G. JOHNSON                                DAVID L. LADD
Attesting Officer                                    Commissioner of Patents